(12) United States Patent
Karlsen (10) Patent No.: US 9,292,502 B2
(45) Date of Patent: Mar. 22, 2016

(54) MODULAR PLATFORM FOR WEB APPLICATIONS AND SYSTEMS

(71) Applicant: Web Computing AS, Oslo (NO)

(72) Inventor: Geir Christian Karlsen, Yven (NO)

(73) Assignee: Web Computing AS, Oslow (NO)

( * ) Notice: Subject to any disclaimer, the term of this patent is extended or adjusted under 35 U.S.C. 154(b) by 0 days.

(21) Appl. No.: 14/192,993

(22) Filed: Feb. 28, 2014

(65) Prior Publication Data

US 2014/0245255 A1 Aug. 28, 2014

Related U.S. Application Data

(60) Provisional application No. 61/770,434, filed on Feb. 28, 2013.

(51) Int. Cl.
*G06F 9/44* (2006.01)
*G06F 17/30* (2006.01)
*G06F 9/54* (2006.01)

(52) U.S. Cl.
CPC *G06F 17/30* (2013.01); *G06F 8/38* (2013.01); *G06F 9/44* (2013.01); *G06F 9/54* (2013.01)

(58) Field of Classification Search
CPC ............. G06F 8/30; G06F 17/30; G06F 8/38; G06F 9/44; G06F 9/54
USPC .................................................. 717/104–119
See application file for complete search history.

(56) References Cited

U.S. PATENT DOCUMENTS

| 7,281,202 | B2 * | 10/2007 | Croney et al. | 715/255 |
| 8,738,755 | B2 * | 5/2014 | Bohm et al. | 709/223 |
| 2007/0225992 | A1 * | 9/2007 | Palmieri et al. | 705/1 |
| 2009/0257085 | A1 * | 10/2009 | Kondo | 715/205 |

OTHER PUBLICATIONS

Yi Chen, "Efficient Web-based Application Development Tools on XML-enabled Databases", 2008 retrieved from http://mro.massey.ac.nz/handle/10179/896 , Master thesis, Massey University, Palmerston North, New Zealand, pp. 1-80.*
Steve Muench, "Building a Web Store with Struts & ADF Frameworks", 2005, Oracle Technology Network, 79 pages.*

* cited by examiner

*Primary Examiner* — Ted T Vo
(74) *Attorney, Agent, or Firm* — Fox Rothschild, LLP; Robert J. Sacco; Carol E. Thorstad-Forsyth (57) ABSTRACT

A method and system for providing a web platform configured to assist in a development of a web application. The method includes developing a core layer of a web development software stack including first bundles organized into a first bundle group by an underlying web framework, developing a ket layer of the web development software stack including second bundles organized into the first bundle group by the underlying web framework, developing an application layer of the web development software stack including third bundles organized into a second bundle group by the underlying web framework, and allowing modification of code for each of the core layer, ket layer and application layer exclusively by web developers having a respective classification of a plurality of different classifications. The system includes various hardware components configured to perform the method for providing the web platform.

20 Claims, 8 Drawing Sheets

MODULAR PLATFORM FOR WEB APPLICATIONS AND SYSTEMS

CROSS-REFERENCE TO RELATED APPLICATIONS

This application claims the priority benefit of U.S. Provisional Application No. 61/770,434 entitled "Modular Platform for Web Applications and Systems" and filed Feb. 28, 2013, the content of which is hereby incorporated by reference in its entirety.

STATEMENT OF THE TECHNICAL FIELD

The inventive arrangements relate to systems and methods for web development. More particularly, the inventive arrangements concern implementing systems and methods for providing a modular platform for web applications.

DESCRIPTION OF THE RELATED ART

A web application is an application that is accessible over a network. A web application may be hosted in a common web browser that renders the application. Such web applications include, but are not limited to, webmail, wikis, and online retail sales. Web applications are developed using development software products, such as Joomla!® used to develop websites and WordPress® used to develop web blogs. Web development tools also exist that further support the development and the publishing of web applications developed using development software products.

The development software products enable developers to build web applications capable of running on various web application platforms. Such web application platforms include, but are not limited to, a Symfony® platform which is written in PHP and implements a Model View Controller ("MVC") paradigm. The Symfony® platform is a full-stack web framework that provides a collection of libraries (i.e., code or software). The collection of libraries are used to provide generic (i.e., common) functionalities and activities via well defined Application Programming Interfaces ("APIs"). The libraries include, but are not limited to, a database connection library, a user interface forms library, a security library, and a caching library. As such, the Symphony platform provides a tool to make the web application development process easy, intuitive and efficient. The Symphony platform also makes it easy to maintain and upgrade a web application.

The MVC paradigm is a way of relating a user interface to underlying data models. The MVC paradigm has three main components or objects to be used in software development: a model; a view; and a controller. These three main components and the relationships therebetween are referred to in the art as an MVC triad. The model consists of application data and business rules. In most cases, the view consists of a user interface. The view may also comprise a non-visual component. The controller processes user inputs and controls the views and models in accordance with the user inputs. For example, a user may perform user-software interactions for scrolling through a document. In turn, the controller performs operations to change the view's presentation of the model by scrolling through the document. The controller can also perform operations for updating the state of the model in response to a user-software interaction for editing a document.

Figure 1:
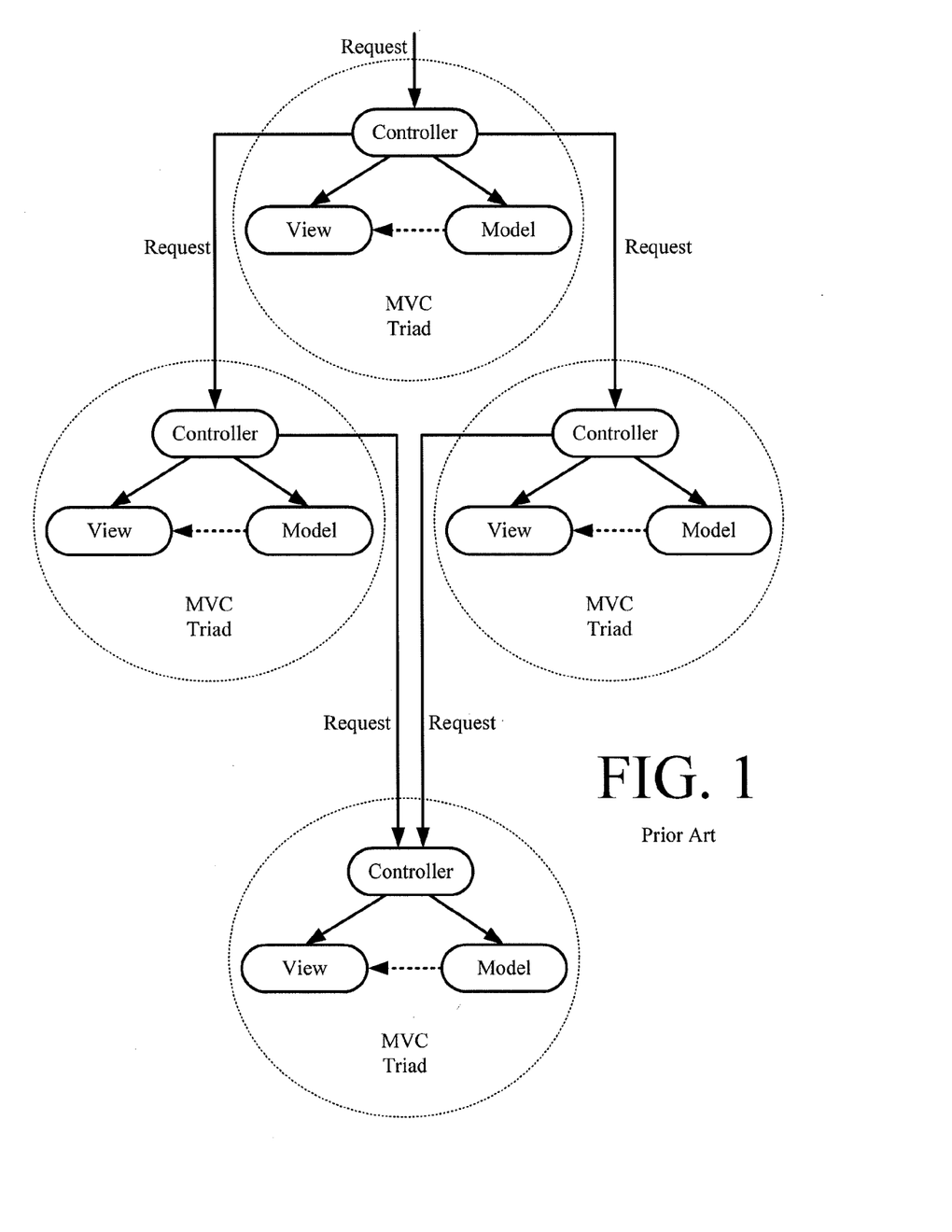
FIG. 1 is a schematic illustration of an exemplary HMVC paradigm.
Figure 2:
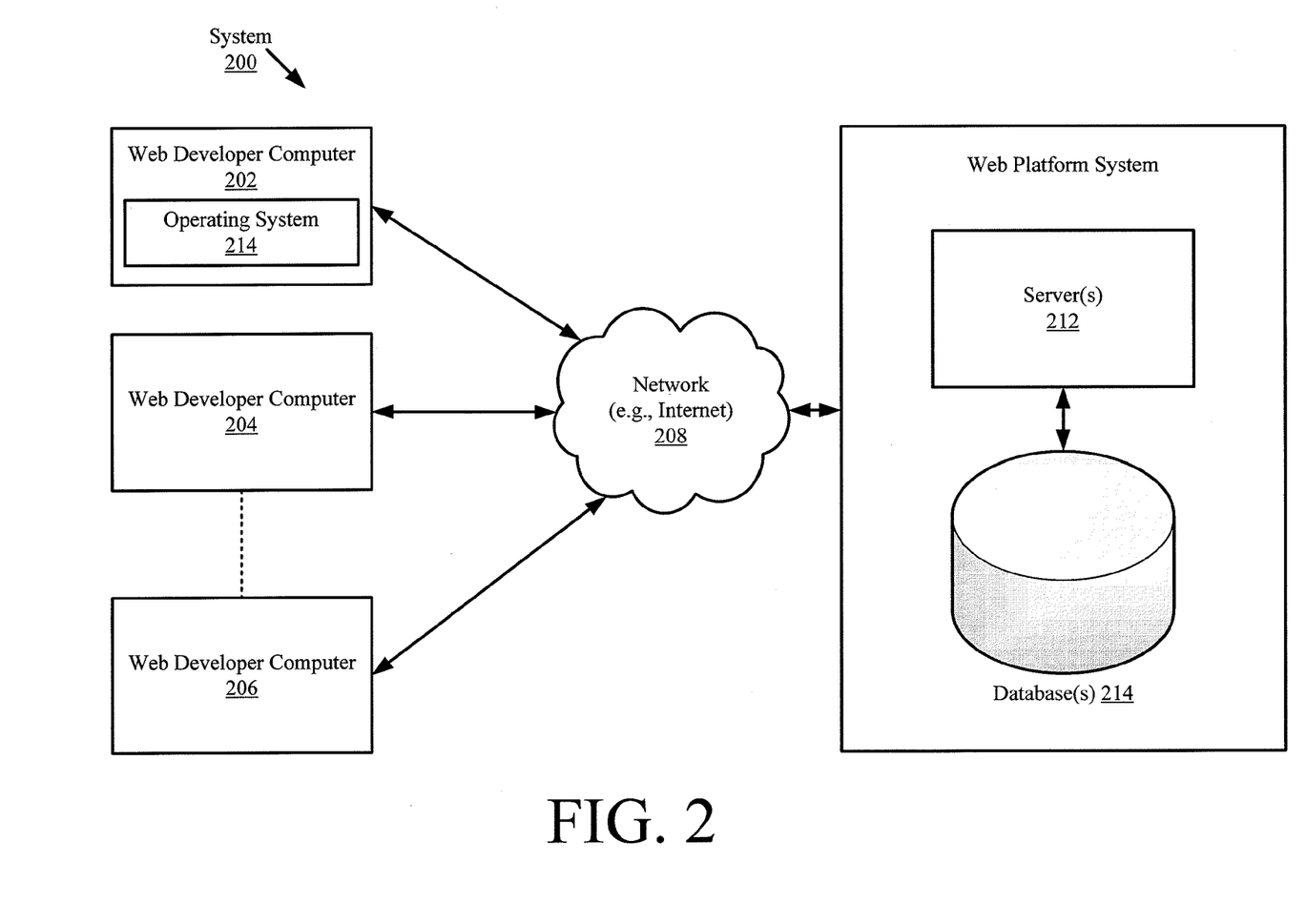
FIG. 2 is a schematic illustration of an exemplary web development system that is useful for understanding the present invention.

The MVC paradigm has some limitations with regard to scalability. As such, a solution was created which resolves the scalability limitations of the MVC paradigm. This solution is known as the Hierarchical MVC ("HMVC") paradigm. A schematic illustration of a conventional HMVC paradigm is provided in FIG. 1. As shown in FIG. 1, the HMVC paradigm is defined by a hierarchical collection of MVC traids operating as one web application. Each MVC triad is independent of the other MVC triads and can execute without the presence of any other MVC triad. All requests to the MVC triads must use the controllers thereof. Requests are passed through the hierarchical structure via the controllers (i.e., from parent controllers to children controllers) to the respective MVC triad, as shown in FIG. 1. In this regard, it should be understood that the top most controller (or Front controller) is generally a single PHP file configured to handle every request coming into a web application, and to route requests to different parts of the web application. The controller of the child node that receives the request then performs operations to return a response, or routes the request to another controller of a child node further down the HMVC for processing.

Once the web application has been developed in accordance with the MVC or HMVC paradigm, it is deployed to a remote server. Thereafter, the web application can be used to start a conversation via a remote network between a client device and the remote server. Every conversation on the remote network starts with a request for at least accessing a resource (e.g., a request to display all blog posts). The request is a text message created by a client device (e.g., a client computer executing a web browser application) typically in a Hypertext Transfer Protocol ("HTTP") format. The client device sends the request to the remote server, and then waits for a response. In turn, the remote server performs operations in accordance with the HMVC paradigm to generate an appropriate response message. Such operations involve routing the request to the appropriate portion of the web application according to the above-described HMVC paradigm, and handling the request by the appropriate portion of the web application to generate the response message. Thereafter, the response message is communicated from the remote server to the client device.

SUMMARY OF THE INVENTION

In one general respect, a sample scenario as described herein includes a method for providing a web platform configured to assist in a development of a web application. The method can includes developing a core layer of a web development software stack including first bundles organized into a first bundle group by an underlying web framework, developing a ket layer of the web development software stack including second bundles organized into the first bundle group by the underlying web framework, developing an application layer of the web development software stack including third bundles organized into a second bundle group by the underlying web framework, and allowing modification of code for each of the core layer, ket layer and application layer exclusively by web developers having a respective classification of a plurality of different classifications.

In the method, the first bundles can be organized into a toolbox group and include one or more code segments configured to provide core operational functionalities for a system. Similarly, the second bundles can be organized into the toolbox group and include one or more code segments configured to provide business logic and operations for the system.

In the method, the third bundles can be organized into a vendor bundle group and include one or more code segments configured to provide display logic for a system.

Additionally, the method can further include developing a first application programming interface ("API") layer between the core layer and the ket layer to facilitate communication between the core layer and the ket layer.

The method can also include developing a second API layer between the ket layer and the application layer to facilitate communication between the ket layer and the application layer. The second API layer can be configured such that communication between the application layer and the ket layer is unidirectional from the application layer to the ket layer. The application layer can be further configured to access one or more of the second bundles from the ket layer.

Additionally, the method can further include developing a source API related to a web application to be implemented, providing at least a portion of the source API to a first work environment associated with generating an application source code including one or more code segments for execution within the application layer, and providing at least a portion of the source API to a second work environment associated with generating a ket source code including one or more code segments for execution within the ket layer. The method can further include combining the application source code and the ket source code thereby resulting in the web application to be developed.

In another general respect, a sample scenario as described herein includes a system for providing a web platform configured to assist in a development of a web application. The system includes a processing device and a non-transitory computer readable medium in communication with the processing device. The non-transitory computer readable medium includes one or more programming instructions for causing the processing device to develop a core layer of a web development software stack including first bundles organized into a first bundle group by an underlying web framework, develop a ket layer of the web development software stack including second bundles organized into the first bundle group by the underlying web framework, develop an application layer of the web development software stack including third bundles organized into a second bundle group by the underlying web framework, and allow modification of code for each of the core layer, ket layer and application layer exclusively by web developers having a respective classification of a plurality of different classifications.

In the system, the first bundles can be organized into a toolbox group and include one or more code segments configured to provide core operational functionalities for a system. Similarly, the second bundles can be organized into the toolbox group and include one or more code segments configured to provide business logic and operations for the system.

Additionally, in the system, the third bundles can be organized into a vendor bundle group and include one or more code segments configured to provide display logic for a system.

In the system, the non-transitory computer readable medium can further include one or more programming instructions for causing the processing device to develop a first application programming interface ("API") layer between the core layer and the ket layer to facilitate communication between the core layer and the ket layer.

Also, in the system, the non-transitory computer readable medium can further include one or more programming instructions for causing the processing device to develop a second API layer between the ket layer and the application layer to facilitate communication between the ket layer and the application layer. The second API layer can be configured such that communication between the application layer and the ket layer is unidirectional from the application layer to the ket layer. The application layer can be further configured to access one or more of the second bundles from the ket layer.

Additionally, in the system of claim 11, the non-transitory computer readable medium can further include one or more programming instructions for causing the processing device to develop a source API related to a web application to be implemented, provide at least a portion of the source API to a first work environment associated with generating an application source code comprising one or more code segments for execution within the application layer, and provide at least a portion of the source API to a second work environment associated with generating a ket source code comprising one or more code segments for execution within the ket layer. The non-transitory computer readable medium can further include one or more programming instructions for causing the processing device to combine the application source code and the ket source code thereby resulting in the web application to be developed.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Examples related to specific implementation scenarios of the present disclosure will be described in relation to FIGS. 1-8. The present disclosure is related to a web platform for developing web applications. The web platform of the present disclosure is configured to inter-operate with any known or to-be-known web framework. Such web frameworks include, but are not limited to, ASP.NET®, JavaEE®, WebObjects®, Web2py®, OpenACS®, Catalyst®, Mojolicious®, Django®, and Symfony2®. These known web frameworks generally gather multiple software libraries that are useful for web development into a single cohesive software stack for web developers to efficiently access and use. The software stack can be a set of software subsystems or components needed to deliver a fully functional solution. For example, to develop a web application, a web developer accesses a computing device (e.g., one of computers 202-206 of FIG. 2) executing an operating system (e.g., operating system 214 of FIG. 2), at least one web server (e.g., web server 212 of FIG. 2) communicatively coupled to the computer via a network (e.g., network 208 of FIG. 2), at least one data storage structure such as a database (e.g., database 214 of FIG. 2), and a programming language.

Figure 3:
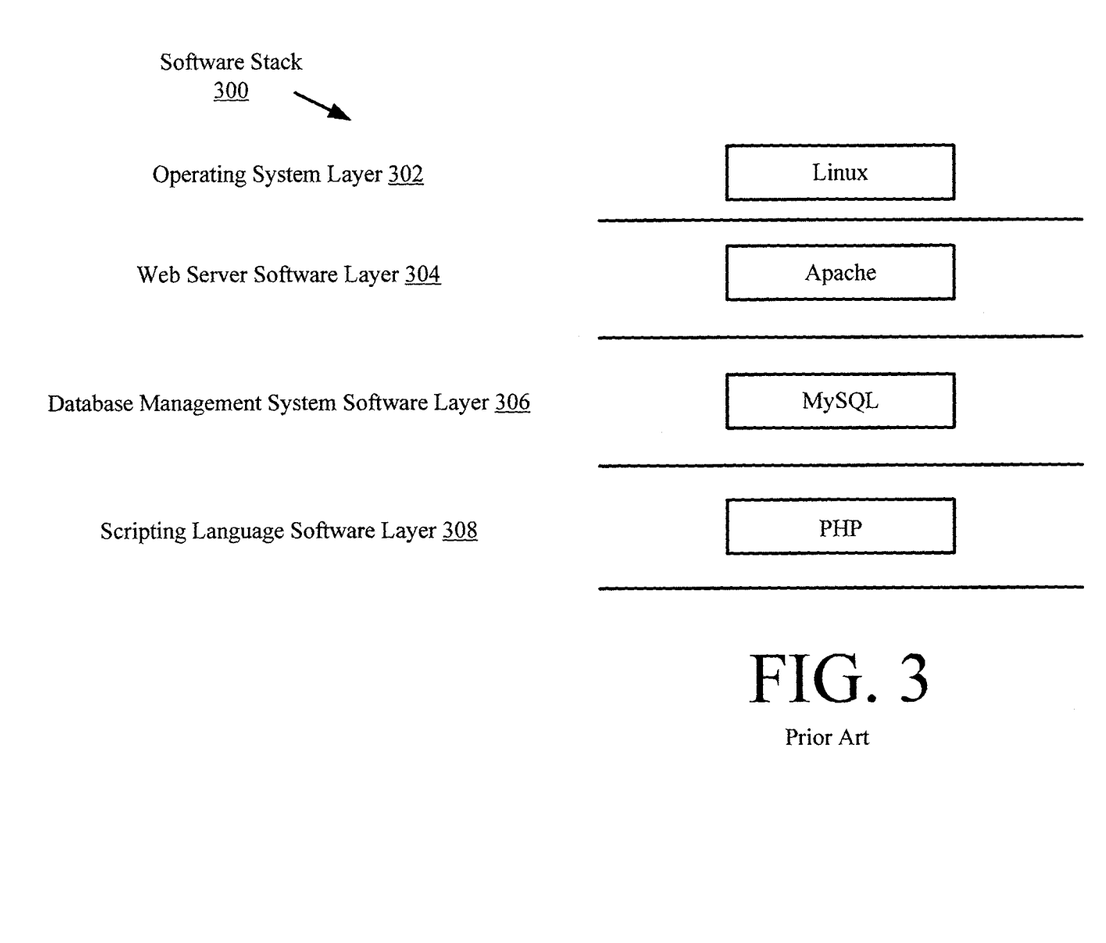
FIG. 3 is a schematic illustration of an exemplary conventional software stack.

As shown in FIG. 3, the software stack 300 can include, but is not limited to, an operating system layer 302, a web server software layer 304, a database management system software layer 306 and a scripting language software layer 308. Each layer of the software stack 300 can further include one or more associated operating systems, management systems, interfaces or programming languages. For example, the operating system layer 302 can include one or more operating systems, such as an open-source operating system like Linux®. Similarly, the web server software layer 304 can include a web server application such as Apache HTTP Server®, or simply Apache. The database management layer 306 can include an associated relational database management system such as MySQL, configured to receive and process structured query language (SQL) requests. The scripting language software layer 308 can include one or more associated scripting languages such as PHP.

The software stack 300 as shown in FIG. 3 can be hosted locally, for example, at a web server (e.g., web server 212 of FIG. 2) accessible by a user over a data network such as a local area network. However, the software stack 300 may be remotely located at, for example, a remote and distributed server accessible via a wide area network such as the Internet. Such a remotely accessible server may be implemented, for example, in a cloud based architecture. It should be noted that these examples of where the software stack are hosted are provided by way of example only, and are not intended to limit the use of the present invention as described herein.

Web frameworks typically follow a particular architectural pattern, such as an MVC architectural pattern, to separate a data model having one or more business rules from a user interface. The term "data model", as used herein, refers to an abstract model that documents and organizes business data for communication between team members and provides a plan for developing web applications (more specifically, a plan specifying how data is stored and accessed). A data model can include, but is not limited to, a database model and a data exchange model. The term "business rule", as used herein, refers to a rule that defines or constrains some aspect of a business organization. The term "user interface", as used herein, refers to a system by which users interact with a machine. By following an architectural pattern, code is segmented or modularized so as to promote code reuse.

The code segments are often organized into bundles. Bundles can be organized into at least two separate groups, namely a Toolbox Bundle ("TB") group and a Vendor Bundle ("VB") group. Bundles of the TB group are referred to herein as TB bundles. Similarly, bundles of the VB group are referred to herein as VB bundles. In accordance with the present invention, some or all of the TB and VB bundles are further separated into web development layers. The manner in which the TB and VB bundles are further separated into web development layers will become evident from the following discussion.

The TB group bundles generally hold all framework classes that provide the structure of a web based system. The term "framework class", as used herein, refers to a construct that defines the properties and functionality of a feature. For example, a framework class can include data field descriptions and subroutines with the ability to operate on a data object (e.g., a table, a row or column of a table, or an entry in a table). One or more operations may alter the state of the data object, or simply provide ways of accessing the data object. For example, one operation can update a specific entry within a table, while another operation retrieves data stored within a specific entry on the table.

The TB group bundles can also include abstract classes used by VB group bundles to implement development goals. The TB group bundles provide tools and utilities for web developers which reduce the competence level needed for implementing standards and protocols. Such protocols include, but are not limited to, authentication protocols and authorization protocols. TB group bundles are typically stored on one or more remote servers such that they are accessible by web developer computing devices (e.g., web developer computers 202-206 of FIG. 2) at a plurality of different remote locations.

The VB group bundles generally include all implementation classes for each vendor that develops a web application using the web platform of the present invention. VB group bundles mainly use framework classes of the TB group bundles and architectural patterns implemented by the TB group bundles. VB group bundles facilitate the development of a specific product by a web developer. VB group bundles are stored and versioned independent from TB group bundles, thus providing for different companies to have closed source bundles based on the web platform. Thus, a system is provided where multiple closed source VB group bundles can access the same TB group bundle.

Figure 4:
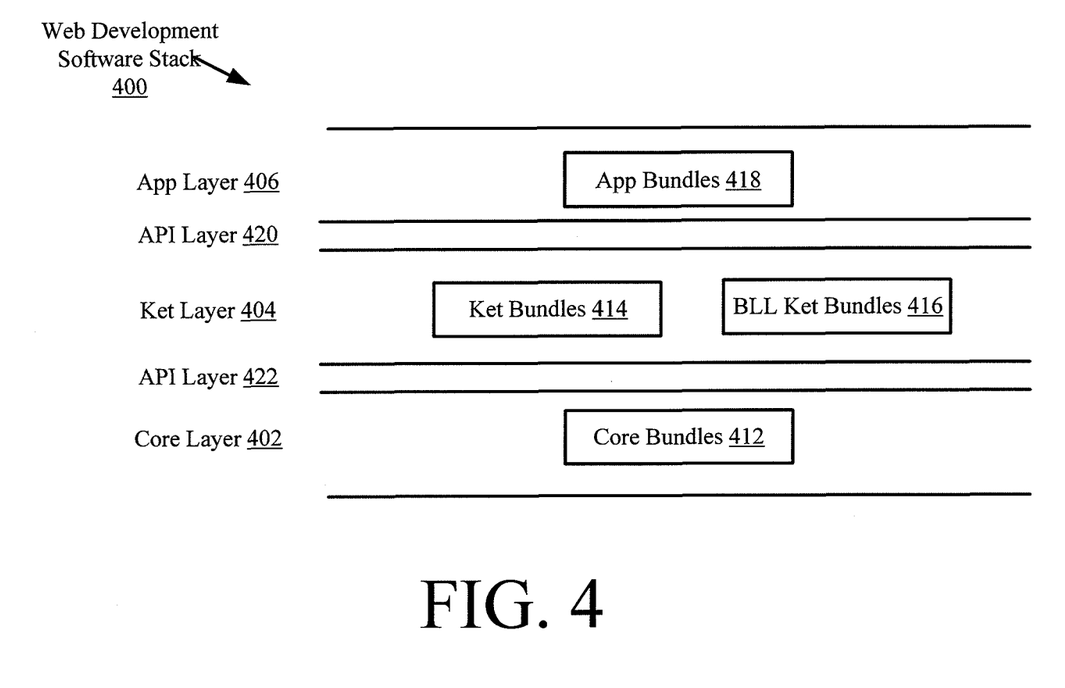
FIG. 4 is a schematic illustration of an exemplary web development software stack that is useful for understanding the present invention.

Referring now to FIG. 4, there is provided a schematic illustration of an example web development software stack 400 that is useful for understanding the present disclosure. The web development software stack 400 can be implemented by, for example, the system 200 of FIG. 2. As shown in FIG. 4, the web development software stack 400 includes a plurality of software layers into which some or all of the TB and VB group bundles of the underlying web framework are further separated. The software layers include a Core layer 402, a Ket layer 404, and an App layer 406. Each of the layers 402-406 has a separate set of functionalities and code responsibilities, as will be discussed below. The layers 402-406 enable the provision of an improved web development team organization and structure according to the teachings of the present disclosure.

The Core layer 402 includes bundles providing core functionalities of the system 200. These bundles are referred to herein as "Core bundles" 412. The Core bundles 412 behave like libraries holding framework classes, architectural patterns and configurations, without which the system cannot function properly. The Core layer 402 can also contain all of the structural classes for both the App layer 406 and the Ket layer 404. In such a scenario, these "upper" layers 404, 406 can inherit or utilize the structural classes stored within the Core layer 402. For example, framework classes for authentication and authorization are contained in the Core layer 402 for access by both the App layer 406 and the Ket layer 404.

Modifications of Core bundles 412 can be limited to those who have a particular classification (e.g., kernel developers) or security level authorization, since such modifications are propagated through the system and require a great deal of knowledge to implement. For example, any bug or other programming error introduced into one or more Core bundles 412 will be propagated throughout the other layers, and the system as a whole. Also, in some scenarios, a Core bundle 412 cannot be developed or modified without the exclusive permission of the web platform and must be approved by a dedicated web platform body. In these or other scenarios, the Core bundles 412 are contained in the TB group. Still, it should be noted that the present disclosure is not limited in this regard. For example, the Core bundles 412 can alternatively or additionally comprise vendor-specific bundles which are contained in the TB group or another group.

As described herein, the Ket layer 404 includes bundles providing business logic for the system. These bundles are referred to herein as "Ket bundles". The Ket bundles 414 comprise bundles including code segments for manipulating entities and entity models. The term "entity", as used herein, refers to a data object that holds no significant business logic. The term "entity model", as used herein, refers to a holder of database logic (e.g., query syntax and type conversion). The Ket layer 404 facilitates the provision of a system with the flexibility to easily change a database layer (e.g., database management system software layer 306 of FIG. 3) without making any code changes on an upper layer (e.g., layers 302 and 304 of FIG. 3). Security mechanisms can be provided in the Ket layer 404 to ensure that the database layer (e.g., database management system software layer 306 of FIG. 3) is not compromised.

The Ket bundles can also include bundles holding Business Logic Library ("BLL") classes configured for implementing business logic. These bundles are referred to herein as "BLL Ket bundles" 416. BLL Ket bundles 416 include code segments that use underlying entities and entity models as described above. The business logic can include, but is not limited to, calculations, relationships, and service communications. The BLL Ket bundles 416 can be stored locally, or stored remotely and accessed as a remote service. Such a remotely stored and accessed arrangement makes the system as described herein a natural hybrid of an HMVC architecture.

Similar to the Core bundles 412, modifications of the Ket bundles 414, 416 can be limited to those web developers who have a particular classification or security classification (e.g., Ket layer developers), thereby providing these web developers with the necessary focus on business logic and modeling problems for making such modifications. In some scenarios, Ket bundles 414, 416 are contained in the TB group and are by definition VBs since they represent vendor business logic. However, this is merely shown by way of example only, and the Ket bundles 414, 416 can be belong to alternative groups.

The App layer 406 includes bundles of the VB group which hold the system frontend providing the necessary display logic for the user interface and user experience (e.g., specific interface views and controllers). These bundles are referred to herein as "App bundles" 418. The App bundles 418 include code segments configured to invoke Ket layer functionality provided by BLL services for performing related business logic operations. Modifications of App bundles 418 can be limited to those web developers who have a particular classification or security authorization (e.g., App layer developers), thereby providing these web developers with the necessary focus on user interface and user experience for making such modifications.

The communication between layers 402-406 is implemented through service orientated classes included in the BLL bundles 416. These services can be implemented in the Ket layer 404 and are invoked by the App layer 406. As such, the architecture of stack 400 enables: (a) a special feature that one or more BLL bundles 416 can be accessed directly through function calls when the App layer 406 and the Ket layer 404 are located on the same run-time environment; and (b) a special feature that the BLL bundles 416 can be accessed remotely through various remote data access service protocols (e.g., a SOAP® web service, a REST® web service, a JSON® web service, WebSockets®, and/or Transmission Control Protocol pipes).

The communication between the individual layers 402-406 is achieved through one or more API layers. For example, communication between the App layer 406 and the Ket layer 404 can be achieved through API layer 420. Similarly, communication between the Ket layer 404 and the Core layer 402 can be achieved through API layer 422. The maintenance of the API layers 420, 422 can be assigned to one or more classes of web developers. For example, the maintenance of API layers 420, 422 can be shared by the App layer developers and the Ket layer developers. Alternatively or additionally, the API layers 420, 422 can be created and maintained by web developers of a different classification, such as a business analyst classification. In some scenarios, a business analyst's only contribution to the actual code is to create any necessary interfaces in direct agreement with a customer, thus providing a natural software development network environment such as, for example, a SCRUM environment.

Figure 5:
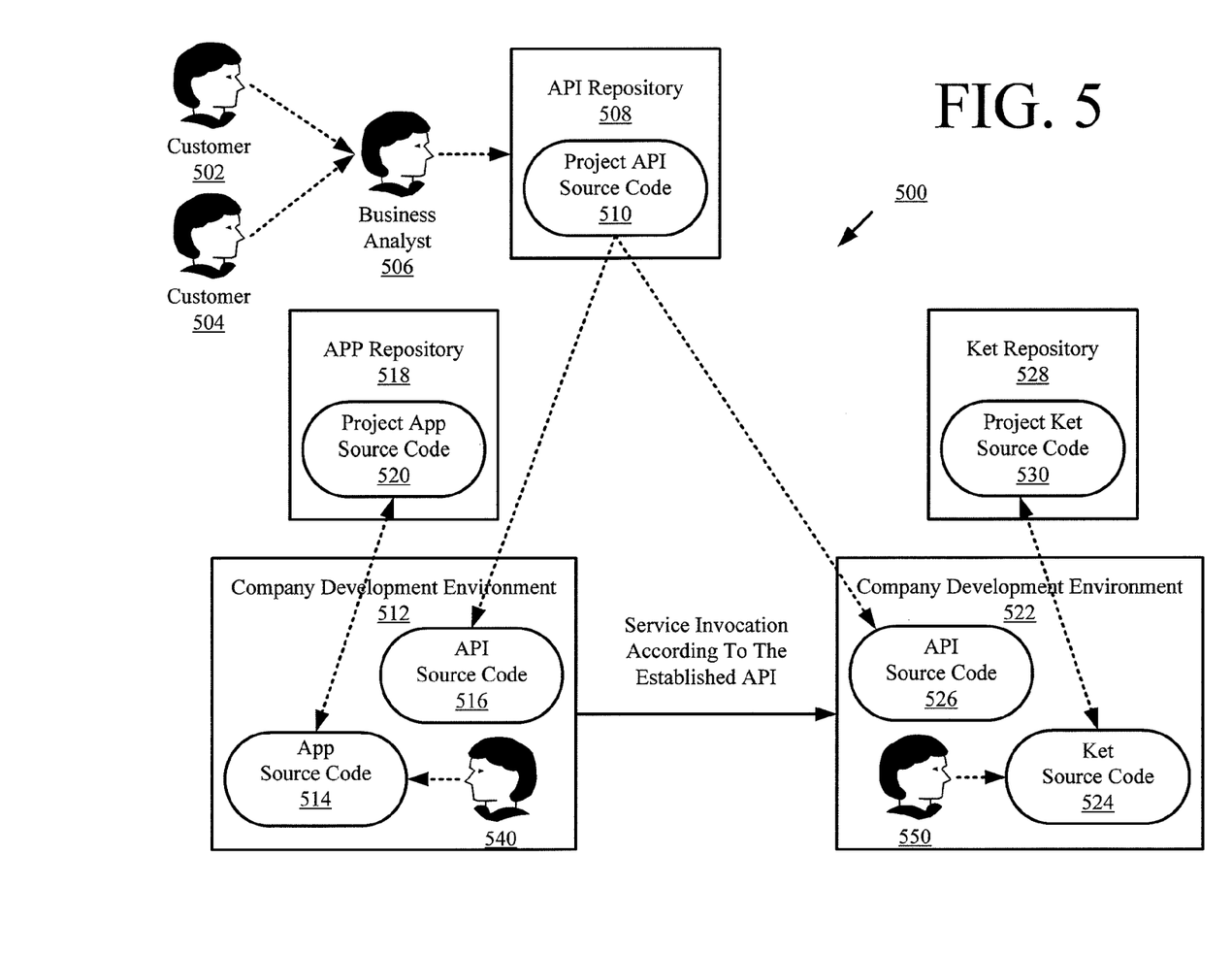
FIG. 5 is a schematic illustration of an exemplary process for creating a web application for a customer that is useful for understanding the present invention.

Referring now to FIG. 5, there is provided a schematic illustration of a sample process 500 for creating a web application for one or more customers 502, 504. As shown in FIG. 5, customers 502, 504 can work with a business analyst 506 to develop project API source code 510. For example, the customers 502, 504 can provide the business analyst 506 with a set of criteria or specific operations related to the features and functionality they would like their web application to include, and the business analyst (either solely or with the assistance of one or more programmers) puts together the project API source code 510. The project API source code 510 includes the logic that is to be implemented in the web application as determined based upon the discussions between the business analyst 506 and the customer 502, 504 regarding the features and functionality of the web application to be developed. For example, the project API source code 510 could include code for restricting access to a particular web page to those who have a particular classification (e.g., management). The project API source code 510 is stored in an API repository 508.

After the project API source code 510 has been created, all or a portion of the API source code 516, 526 is distributed to the company development environment 512 for an App layer (e.g., App layer 406 of FIG. 4) and the company development environment 522 for a Ket layer (e.g., Ket layer 404 of FIG. 4). For example, only a portion of the project API source code 510 related to the App layer can be sent to the company development environment 512 as the API source code 516. Similarly, only a portion of the project API source code 510 related to the Ket layer can be sent to the company development environment 522 as the API source code 526. Alternatively, each of the company development environments 512, 522 can receive the entirety of the project API source code 510. Although not shown in FIG. 5, in some scenarios, the API source code 510, 516, 526 may be stored in an App repository 518 and a Ket repository 528, in addition to the API repository 508.

In the company development environment 512, a web developer 540 develops App source code 514 containing the logic for displaying the user interface and providing the user experience (e.g., views and controllers) of content as determined based upon the received API source code 516. For example, the App source code 514 includes logic for the design and display of Graphical User Interfaces ("GUIs"), elements of GUIs, and transitions between GUIs. The App source code 514 is stored in the App repository 518 as project App source code 520.

In the second company development environment 522, a web developer 550 develops Ket source code 524 containing the logic for manipulating entities, manipulating entity models, implementing core functionalities, and implementing business rules as determined based upon the received API source code 526. For example, the Ket source code 524 includes logic for communicating with a database (e.g., database 214 of FIG. 2) and querying a database. The Ket source code 524 is stored in the Ket repository 528 as project Ket source code 530.

Notably, the eventual communications between the App source code 514 and Ket source code 524 can be achieved using an API. The API enabled inter-operability of the web platform of the present invention and other platforms that can be used to create the App source code 514. In this regard, the App source code 514 can be developed in some scenarios using other platforms than the web platform described herein. For example, the Ket layer code 524 can define an article bundle from which application layer functionality and code responsibilities can be built using any known or to be known web development software and/or tool.

In a particular scenario, these communications are advantageously unidirectional, i.e. from the App layer to the Ket layer. Such a unidirectional configuration provides protection to the Ket source code since the Ket layer does not know of the existence of the App layer. Also, using such a unidirectional communication arrangement, since the App and Ket layers have separate functionalities and code responsibilities, a web developer (e.g., web developer 550) can modify the Ket source code 524 without causing the App layer to stop working.

Figure 6:
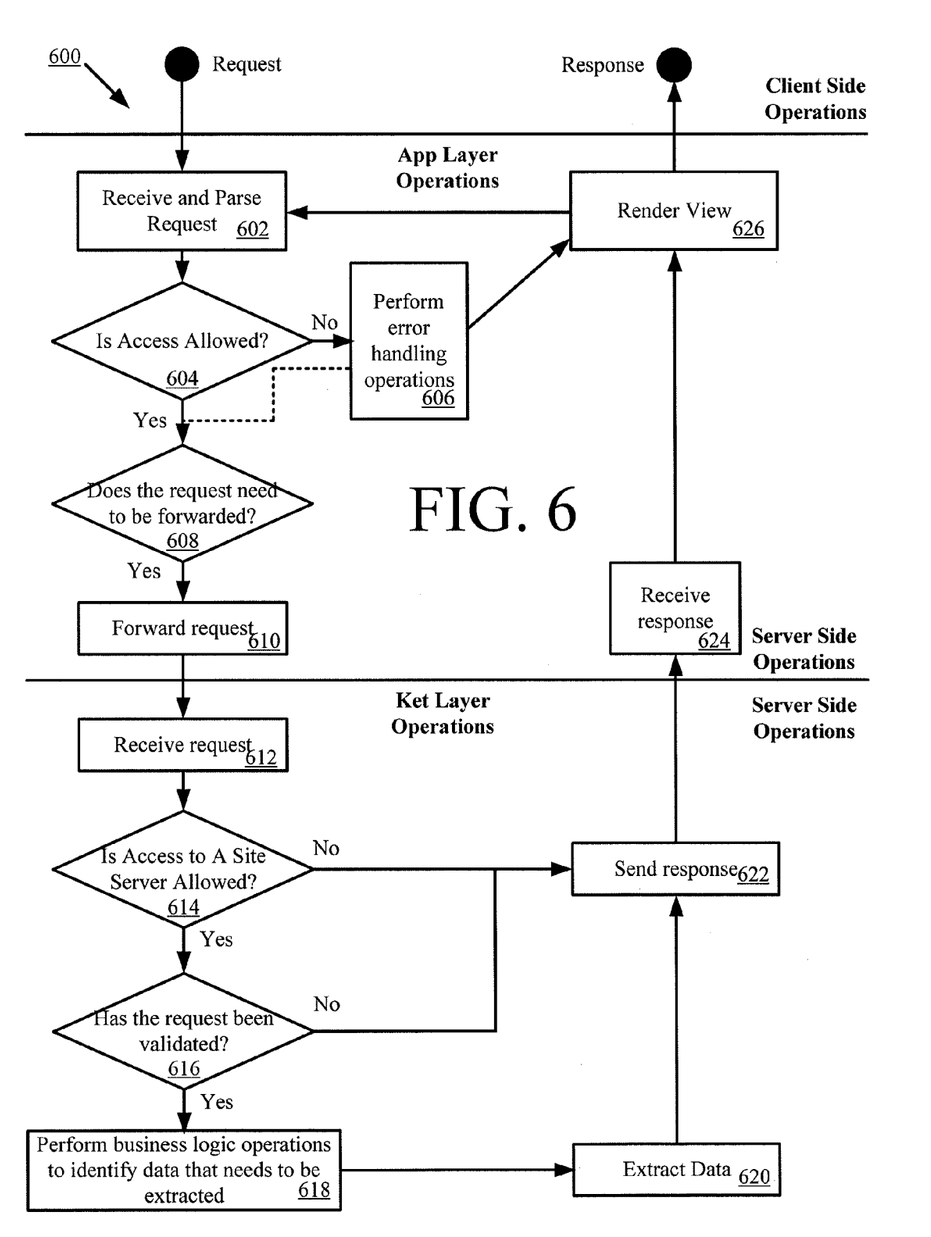
FIG. 6 is a flow diagram of an exemplary method for run-time data flow protection that is useful for understanding the present invention.

Referring now to FIG. 6, there is provided a flow diagram of a sample process 600 for run-time data flow protection. More specifically, the process 600 illustrates operations that are performed by the system when a web developer is creating or modifying a web application. As shown in FIG. 6, the process 600 can begin with client side operations for generating and communicating a request to a server. At the server, operations are performed at the App layer (e.g., App layer 406 of FIG. 4) and the Ket layer (e.g., Ket layer 404). For example, as shown in FIG. 6, the App layer operations are performed in steps 602-610, 624 and 626. The Ket layer operations are performed in steps 612-622. Notably, the operations of the App layer and the Ket layer are separate and distinct. As such, the App layer and Ket layer each behave as a service oriented sub-system. As noted above, API layer software (e.g., software of API layer 420 of FIG. 4) is provided to facilitate communications between the App layer and the Ket layer. Also since the Ket layer business logic provider service BLL is isolated from the rest of the system, project outsourcing is enabled without the need for a non-disclosure agreement.

As shown in FIG. 6, an App layer resource receives 602 and parses a request. Next, a determination 604 is made as to whether or not access to the rest of the application (determined by a given route-controller pair) is granted by the Access Control Service ("ACS"). If access by the ACS service is not allowed [604:NO], then the App layer resource performs 606 one or more error handling operations. Error handling operations are well known in the art, and therefore will not be described in detail herein. Still, it should be understood that such operations can involve logging error information and causing an error message to be presented to a web developer computer (e.g., web developer computer 202-206 of FIG. 2). After the error handling operations are completed, the App layer resource renders 626 a view and a response is sent to the web developer computer.

In contrast, if access by the ACS service is granted [604:YES], then another decision 608 can be made as to whether the request needs to be forwarded to, for example, the Ket layer, or handled by the App layer. If the request needs to be forwarded [608:YES], then the request is forwarded 610 to the appropriate App controller or a Directed Ket BLL process is invoked. Otherwise, if the request is processed, an adequate view is chosen for rendering (HTTP, JSON). If necessary during forwarding 610 the request, a new request directed to the Ket layer can be generated (out of the data in the original HTTP request) and sent, awaiting for the required response which includes data which will be used in the rendering of the pre-chosen view.

At the Ket layer, the request is received 612 by a Ket layer resource. The Ket layer resource can determine 614 whether access to a site server is allowed (similar to the App layer process). This request can be sent to the same ACS service as described above or, alternatively, a separate ACS service can be provided. If access to the site server is not allowed [614: NO], then the process 600 continues with steps 622-626 as described below. In contrast, if access to the site server is allowed [614:YES], the Ket layer resource can then determine 616 whether the request has been validated by the App layer. If the request is not validated [616:NO], then the process 600 continues with steps 622-626 as described below. However, if the request is validated [616:YES], then a Ket layer resource can perform 618 one or more business logic operations to identify data that should be extracted from a database (e.g., database 214 of FIG. 2). The Ket layer can then extract 620 the identified data from a database. Subsequently, a Ket layer resource sends 622 a response to an App layer resource. The App layer resource receives 624 the response, and renders 626 a view that is sent form the server to the web developer computer.

Figure 7:
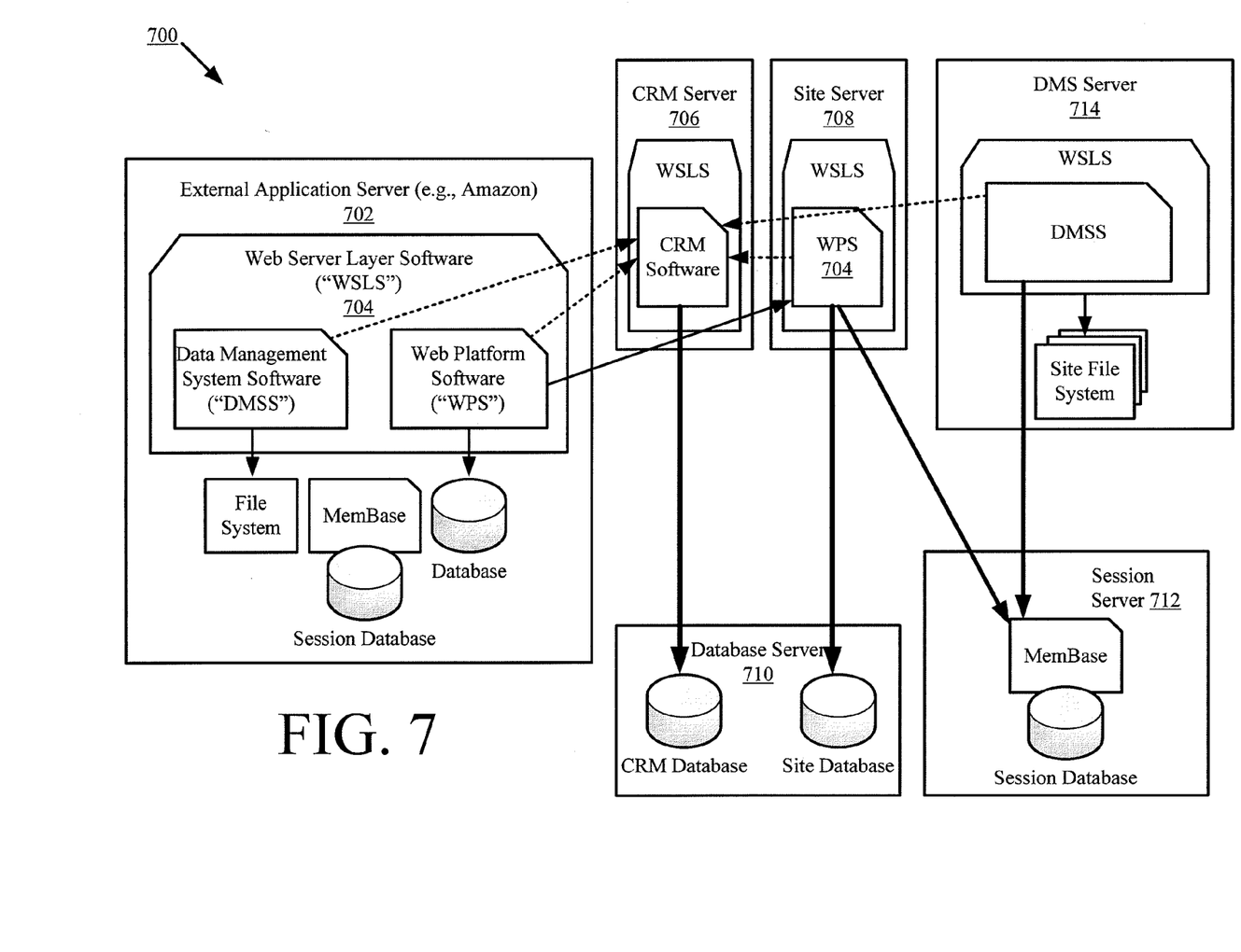
FIG. 7 is a schematic illustration of an exemplary hardware architecture of a system for implementing a web platform according to the present invention.

Referring now to FIG. 7, a schematic illustration of an exemplary hardware architecture 700 for implementing the web platform of the present invention. As noted above, the web platform of the present invention is constructed into a plurality of layers 402, 404, 406. As such, the web platform is highly utilizable for various hardware architectures and deployment scenarios. These architectures include, but are not limited to, a cloud based architecture, a Content Delivery Network ("CDN") architecture, a single server architecture, and a server cluster architecture. The exemplary architecture 700 shown in FIG. 7 is a combined architecture of several cloud clusters being used in unison. Embodiments of the present invention are not limited to this combined architecture.

As shown in FIG. 7, architecture 700 comprises an optional extra application server 702, a CRM server 706, a site server 708, a Database Management System ("DMS") server 714, a database server 710, and a session server 712. The CRM server 706 executes a server-client application, which can be a web-application supporting web service for facilitating the management of a company's interactions with current and future customers. The server-client application is operative to organize, automate, and synchronize sales, marketing, customer-server and technical support. Clients can access the CRM server 706 by using a web browser.

The site server 708 has the web platform software 704 executing thereon. Accordingly, during operation, the site server 708 calls the Ket layer and Core layer operations. In some cases, the site server 708 will be allowed to also call App layer operations. The site server 708 can be a read only server, i.e., nothing can be written to this server. As such, security risks to the site server 708 are mitigated as user's are unable to alter anything stored on the server.

The database server 710 is where all the data is stored. Similarly, the session server 712 can be a database server configured to perform web server session management operations. Web session management operations are well known in the art, and therefore will not be described herein. Still, it should be understood that web session management operations generally involve keeping track of a user's activity across session of interaction with a computing system such as system 200.

The DMS server 714 provides a server cloud on which the external application server 702 can be deployed. The database server 710 is deployed on a server cluster and is used by the CRM server 706 and the site server 708. All components 702-714 can be interlinked regardless of the deployment architecture using a business logic accessibility pattern which provide a unique combination of Software as a Service ("SaaS") and HMVC.

Figure 8:
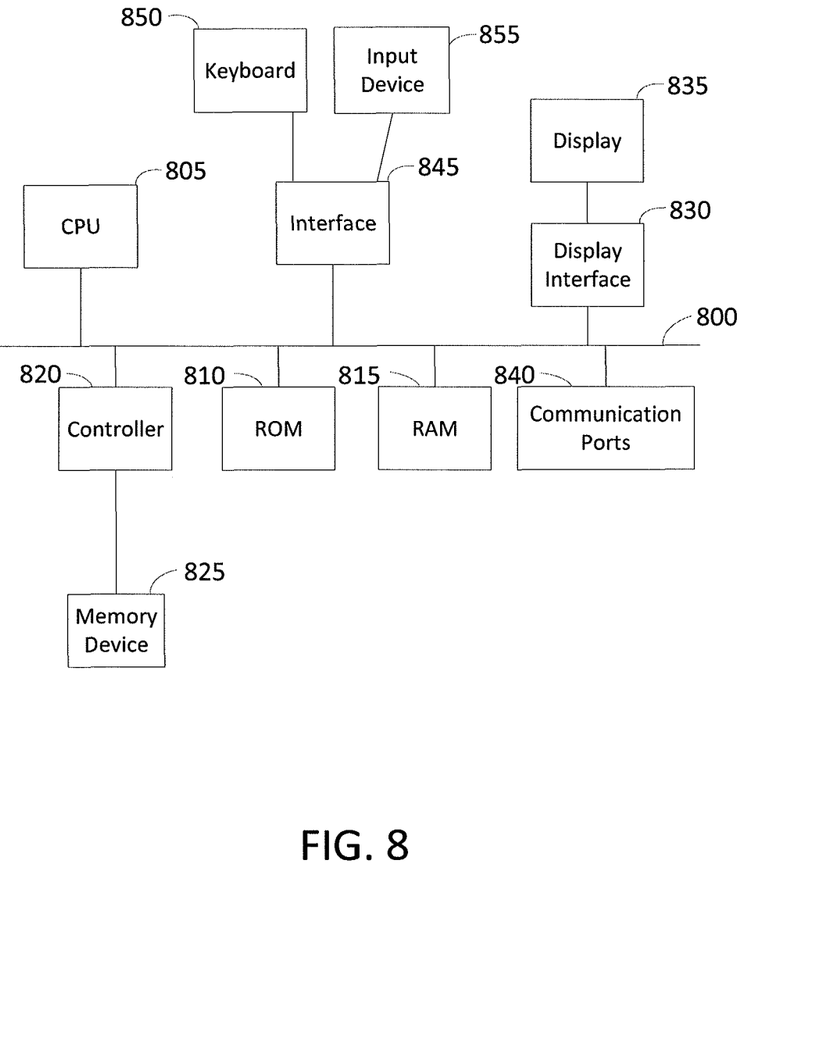
FIG. 8 is a schematic illustration of a computing device for implementing the various methods and processes described herein.

FIG. 8 depicts a block diagram of internal hardware that may be used to contain or implement the various computer processes and systems as discussed above. An electrical bus 800 serves as the main information highway interconnecting the other illustrated components of the hardware. Central Processing Unit ("CPU") 805 is the central processing unit of the system, performing calculations and logic operations required to execute a program. CPU 805, alone or in conjunction with one or more of the other elements disclosed in FIG. 8, is a processing device, computing device or processor as such terms are used within this disclosure. Read Only memory ("ROM") 810 and Random Access Memory ("RAM") 815 constitute examples of memory devices.

A controller 820 interfaces with one or more optional memory devices 825 to the system bus 800. These memory devices 825 may include, for example, an external or internal Digital Video Disc ("DVD") drive, a Compact Disc ("CD") ROM drive, a hard drive, flash memory, a Universal Serial Bus ("USB") drive or the like. As indicated previously, these various drives and controllers are optional devices. Additionally, the memory devices 825 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 810 and/or the RAM 815. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

An optional display interface 830 may permit information from the bus 800 to be displayed on the display 835 in audio, visual, graphic or alphanumeric format. Communication with external devices may occur using various communication ports 840. A communication port 840 may be attached to a communications network, such as the Internet or a local area network.

The hardware may also include an interface 845 which allows for receipt of data from input devices such as a keyboard 850 or other input device 855 such as a mouse, a joystick, a touch screen, a remote control, a pointing device, a video input device and/or an audio input device.

In summary, the above-described web platform has a uniquely layered architecture that enables different applications to connect, provides a new way for structuring large development teams, removes programming language boundaries, supports SCRUM development, and brings forth an individual's contribution to the entire development process. Notably, the web platform changes and improves team organization, deployment architecture independence, and remote development. With regard to team organization, the web platform improves team systematization by clearly defining responsibilities. In this regard, the system architecture defines a developer team organization structure and job classification. For example, the Core layer is used to develop, maintain and modify overall system features (e.g., those for controlling the speed at which the system operates). The Core layer may be configured such that kernel developers are only permitted to develop and/or modify code therefore. The Ket layer is used for data modeling and business logic implementation. The Ket layer may be configured such that backend developers are only permitted to develop and/or modify code therefore. The App layer is used for user interface development and user experience. The App layer can be configured such that frontend developers are only permitted to develop and/or modify code therefore. Such an arrangement provides for a high level of efficiency and operational uptime as code development and/or modification is limited to qualified individuals for each aspect of the software stack.

There is a gentle learning curve for using the web platform in the above-described manner. In this regard, the project development environment can be set up in less than fifteen minutes, resulting in higher productivity rates when compared to traditional development platforms. The web developers are structured in such a way that there are no knowledge intersections. Web developers are focused to develop knowledge for their domain only (specialized work), not wasting time on issues that are the responsibility of developers in other domains, thereby increasing productivity while reducing wasted resources.

With regard to deployment architecture independence, the system can be deployed on multiple environments without communication restrictions. With regard to remote development, the unique combination of SaaS and HMVC allows, an outsourcing subcontractor to be hired for development of modules without having to have access to sensitive parts of the system.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for implementing a web application on a web platform configured to assist in developing the web application, comprising:
   receiving a project source code to utilize a core layer of a web development software stack comprising first bundles organized into a first bundle group by an underlying web framework, wherein the core layer includes framework classes for authorization;
   developing a ket source code for a ket layer of the web development software stack such that the ket layer can act as a first sub-system, wherein the ket layer comprises second bundles organized into the first bundle group by the underlying web framework; and
   developing an application source code for an application layer of the web development software stack such that the application layer can act as a second sub-system, wherein the application layer comprises third bundles organized into a second bundle group by the underlying web framework,
   wherein the framework classes can be accessed by both the ket layer and the application layer.

2. The method of claim 1, wherein the first bundles are organized into a toolbox group and comprise one or more code segments configured to provide core operational functionalities.

3. The method of claim 2, wherein the second bundles are organized into the toolbox group and comprise one or more code segments configured to provide business logic and operations.

4. The method of claim 1, wherein the third bundles are organized into a vendor bundle group and comprise one or more code segments configured to provide display.

5. The method of claim 1, further comprising a first application programming interface layer between the core layer and the ket layer to facilitate communication between the core layer and the ket layer.

6. The method of claim 1, further comprising a second application programming interface layer between the ket layer and the application layer to facilitate communication between the ket layer and the application layer.

7. The method of claim 6, wherein the second application programming interface layer is configured such that communication between the application layer and the ket layer is unidirectional from the application layer to the ket layer.

8. The method of claim 7, wherein the application layer is further configured to access one or more of the second bundles from the ket layer.

9. The method of claim 1, further comprising:
   developing a project source code related to the web application to be implemented;
   providing at least a portion of the project source code to a first work environment associated with generating the application source code comprising one or more code segments for execution within the application layer; and
   providing at least a portion of the project source code to a second work environment associated with generating the ket source code comprising one or more code segments for execution within the ket layer.

10. The method of claim 9, further comprising combining the application source code and the ket source code thereby resulting in the web application.

11. A system for polling a device comprising:
   a processing device; and
   a non-transitory computer readable medium in communication with the processing device, the computer readable medium comprising one or more programming instructions for causing the processing device to:
      receive a project source code to utilize a core layer of a web development software stack comprising first bundles organized into a first bundle group by an underlying web framework, wherein the core layer includes framework classes for authorization;
      develop a ket source code for a ket layer of the web development software stack such that the ket layer can act as a first sub-system, wherein the ket layer comprises second bundles organized into the first bundle group by the underlying web framework; and
      develop an application source code for an application layer of the web development software stack such that the application layer can act as a second sub-system, wherein the application layer comprises third bundles organized into a second bundle group by the underlying web framework,
      wherein the framework classes can be accessed by both the ket layer and the application layer.

12. The system of claim 11, wherein the first bundles are organized into a toolbox group and comprise one or more code segments configured to provide core operational functionalities.

13. The system of claim 12, wherein the second bundles are organized into the toolbox group and comprise one or more code segments configured to provide business logic and operations.

14. The system of claim 11, wherein the third bundles are organized into a vendor bundle group and comprise one or more code segments configured to provide display logic.

15. The system of claim 11, further comprising one or more programming instructions for causing the processing device to develop a first application programming interface layer between the core layer and the ket layer to facilitate communication between the core layer and the ket layer.

16. The system of claim 11, further comprising one or more programming instructions for causing the processing device to develop a second application programming interface layer between the ket layer and the application layer to facilitate communication between the ket layer and the application layer.

17. The system of claim 16, wherein the second application programming interface layer is configured such that communication between the application layer and the ket layer is unidirectional from the application layer to the ket layer.

18. The system of claim 17, wherein the application layer is further configured to access one or more of the second bundles from the ket layer.

19. The system of claim 11, further comprising one or more programming instructions for causing the processing device to:

develop a project source code related to the web application to be implemented;

provide at least a portion of the project source code to a first work environment associated with generating the application source code comprising one or more code segments for execution within the application layer; and provide at least a portion of the project source code to a second work environment associated with generating the ket source code comprising one or more code segments for execution within the ket layer.

20. The system of claim 19, further comprising one or more programming instructions for causing the processing device to combine the application source code and the ket source code thereby resulting in the web application.

\* \* \* \* \*